(12) United States Patent
Gabel et al.

(10) Patent No.: US 10,614,811 B2
(45) Date of Patent: Apr. 7, 2020

(54) HIERARCHICAL SPEECH RECOGNITION RESOLUTION

(71) Applicant: Intel Corporation, Santa Clara, CA (US)

(72) Inventors: Douglas Gabel, Hillsboro, OR (US); Jonathan Huang, Pleasanton, CA (US); Sylvia J. Downing, El Dorado Hills, CA (US); Narayan Biswal, Folsom, CA (US); Binuraj Ravindran, San Jose, CA (US); Willem Beltman, West Linn, OR (US); Vered Bar Bracha, Tel Aviv (IL); Ze'Ev Rivlin, Ra'anana (IL)

(73) Assignee: Intel Corporation, Santa Clara, CA (US)

( * ) Notice: Subject to any disclaimer, the term of this patent is extended or adjusted under 35 U.S.C. 154(b) by 135 days.

(21) Appl. No.: 15/858,763

(22) Filed: Dec. 29, 2017

(65) Prior Publication Data

US 2019/0035404 A1 Jan. 31, 2019

(51) Int. Cl.
| | |
|---|---|
| *G10L 15/22* | (2006.01) |
| *G10L 15/26* | (2006.01) |
| *G10L 15/16* | (2006.01) |
| *G10L 15/32* | (2013.01) |
| *G10L 15/08* | (2006.01) |
| *G10L 15/30* | (2013.01) |

(52) U.S. Cl.
CPC .............. *G10L 15/32* (2013.01); *G10L 15/08* (2013.01); *G10L 15/22* (2013.01); *G10L 15/30* (2013.01); *G10L 2015/088* (2013.01); *G10L 2015/228* (2013.01)

(58) Field of Classification Search
CPC ................................. G10L 15/22; G10L 15/26
See application file for complete search history.

(56) References Cited

U.S. PATENT DOCUMENTS

| | | | |
|---|---|---|---|
| 2015/0025890 A1* | 1/2015 | Jagatheesan | ............ G10L 15/32 704/255 |
| 2018/0197545 A1* | 7/2018 | Willett | .................... G10L 15/30 |

\* cited by examiner

*Primary Examiner* — Shreyans A Patel
(74) *Attorney, Agent, or Firm* — Jordan IP Law, LLC

(57) ABSTRACT

A system, method, apparatus and computer readable medium for hierarchical speech recognition resolution. The method of hierarchical speech recognition resolution on a platform includes receiving a speech stream from a microphone. The speech stream is resolved using a lowest possible level automatic speech recognition (ASR) engine of multi-level ASR engines. The selection of the lowest possible level ASR engine is based on policies defined for the platform. If resolution of the speech stream is rated less than a predetermined confidence level, the resolution of the speech stream is pushed to a next higher-level ASR engine of the multi-level ASR engines until the resolution of the speech stream meets the predetermined confidence level without violating one or more policies.

22 Claims, 11 Drawing Sheets

HIERARCHICAL SPEECH RECOGNITION RESOLUTION

TECHNICAL FIELD

Embodiments generally relate to speech recognition. More particularly, embodiments relate to hierarchical speech recognition resolution.

BACKGROUND

Cloud based speech recognition intelligent assistants, such as, for example, Siri developed by Apple, Alexa developed by Amazon.com, Google Assistant developed by Google, and Cortana developed by Microsoft, offer high speech recognition accuracy at the expense of compromised privacy of speech data, susceptibility to monitoring, high latency, and dependency on connectivity. With most of the intelligent assistants, the speech conversations are sent to the cloud.

BRIEF DESCRIPTION OF THE DRAWINGS

The various advantages of the embodiments will become apparent to one skilled in the art by reading the following specification and appended claims, and by referencing the following drawings, in which:

Figure 1:
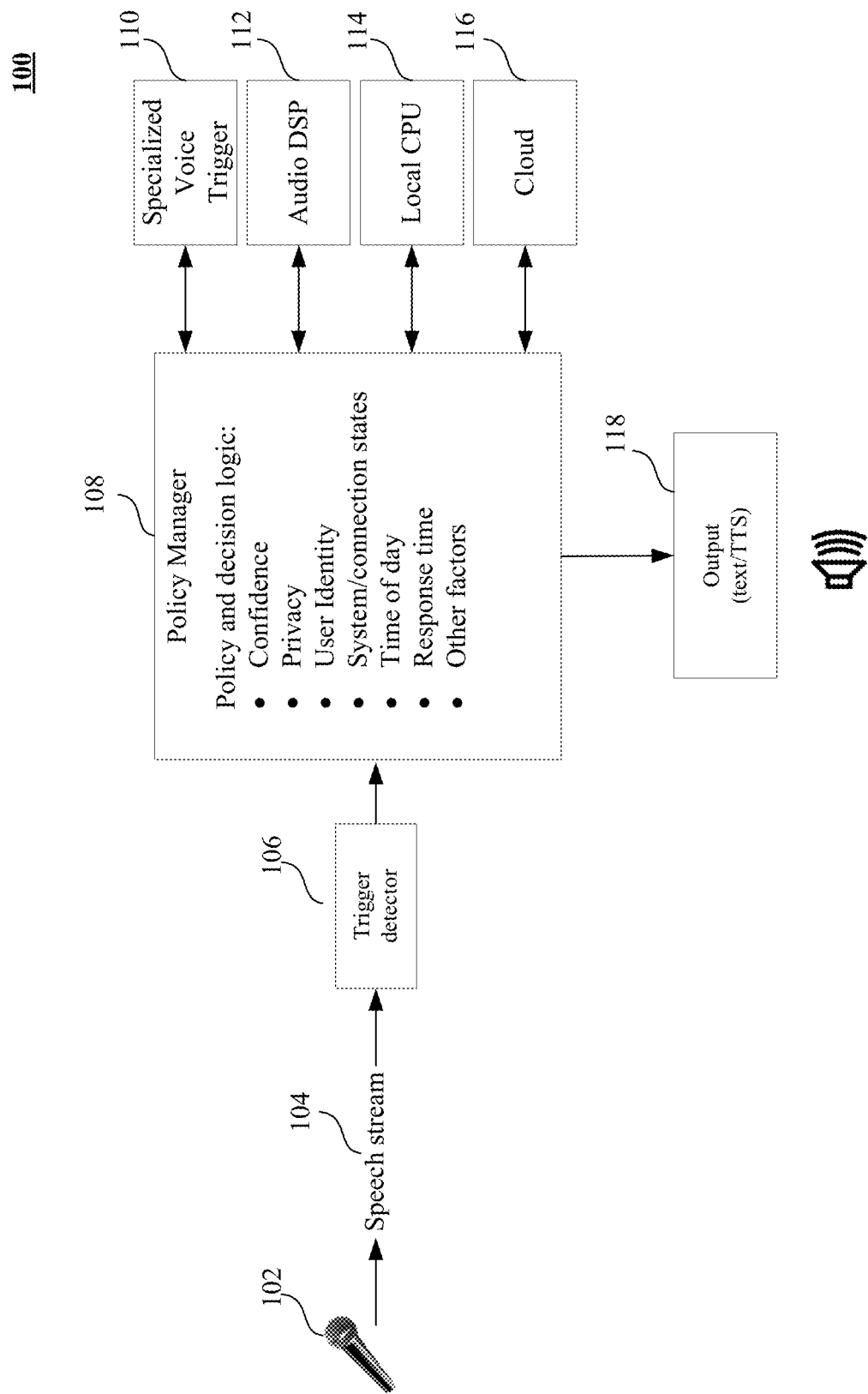
FIG. 1 is a diagram of an example of a system having multiple layers of speech recognition solutions for performing hierarchical levels of speech recognition according to an embodiment.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

DESCRIPTION OF EMBODIMENTS

Technology for hierarchical speech recognition resolution comprises a system having multi-level automatic speech recognition (ASR) engines hierarchically structured to provide more compute power and word recognition with each higher-level ASR engine. The system resolves a speech stream, received from a microphone, at the lowest possible level of the multi-level ASR engines given system constraints and preferences. A policy manager pushes resolution of the speech stream to a hierarchical level of the multi-level ASR engines capable of accurately resolving the speech stream at the lowest possible power level based on policies defined for the system.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device). As used herein, the term "logic" and "module" may refer to, be part of, or include an application specific integrated circuit (ASIC), an electronic circuit, a processor (shared, dedicated, or group), and/or memory (shared, dedicated, or group) that execute one or more software or firmware programs having machine instructions (generated from an assembler and/or a compiler), a combinational logic circuit, and/or other suitable engines that provide the described functionality.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

FIG. 1 is a diagram of a system 100 having multiple levels of speech recognition solutions for performing hierarchical levels of speech recognition according to an embodiment. The system 100 comprises, inter alia, a microphone 102, a trigger detector 106, policy and decision logic (i.e., policy manager) 108, automatic speech recognition engines 110, 112, 114, and 116, and an output 118. The microphone 102 is coupled to the trigger detector 106. The trigger detector 106 is coupled to the policy and decision logic 108. The policy and decision logic 108 is coupled to the automatic speech recognition engines 110, 112, 114, and 116 and the output 118.

The microphone 102 receives a speech stream 104 and sends the speech stream 104 to the trigger detector 106. The trigger detector 106 determines if a speech recognition trigger has been detected. In one embodiment, a trigger may be a voice trigger comprised of a keyword or phrase that triggers the system to activate an automatic speech recognition (ASR) engine of the system. For example, the Echo product, manufactured by Amazon.com, has a virtual voice assistant named "Alexa". In order to trigger the virtual voice assistant, one has to say the word "Alexa" and give a command. In other words, speaking the word "Alexa" is the voice trigger that wakes up Echo to perform the requested command. In another embodiment, a control button on a system may be used to trigger the system to activate the automatic speech recognition engine of the system. For example, Echo has a button that may be pressed to trigger the virtual voice assistant (Alexa). If a trigger is detected, the speech stream may include a request or command.

Other embodiments may use other mechanisms or sounds to trigger the system. In one embodiment, a trigger may be a gesture. For example, a user could gesture by waving a hand from left to right to trigger the system to activate the automatic speech recognition engine. In this instance, the gesture may be captured using a camera.

Once the trigger is detected, the speech stream is sent to the policy and decision logic 108. The policy and decision logic 108 determines the appropriate multi-level ASR engine, such as, for example, ASR engines 110, 112, 114, or 116, to send the speech stream 104 to for resolution.

Figure 2:
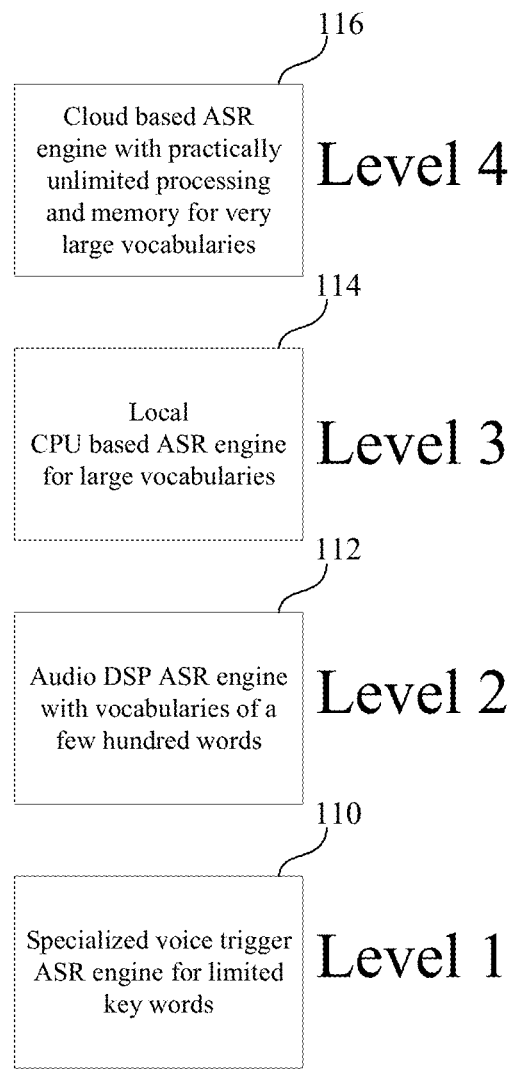
FIG. 2 is a diagram illustrating an example multi-level ASR hierarchical structure according to an embodiment.

FIG. 2 is a diagram illustrating an example multi-level ASR hierarchical structure 200 according to an embodiment. The hierarchical structure 200 illustrates four (4) levels of ASR engines 110, 112, 114, and 116. Although the hierarchical structure 200 illustrates 4 levels of ASR engines, the embodiments are not limited to 4 levels. In other embodiments, the hierarchical structure could have as little as two (2) levels or more than four (4) levels. As shown in FIG. 2, the levels are arranged in ascending order, beginning with an ASR engine 110 that recognizes a few words with limited processing power to an ASR engine 116 having practically unlimited processing power to handle very large vocabularies. The higher the level, the larger the vocabulary, thus requiring more processing power with each ascending level.

Level 1 illustrates the lowest level on the hierarchical structure 200. The ASR engine for Level 1 may be the specialized voice trigger ASR engine 110. The specialized voice trigger ASR engine 110 recognizes a limited number of key words, such as, for example, ON, OFF, STOP, and SET, and 30-40 additional words used to perform simple commands. The types of commands that may be recognized by specialized voice trigger ASR engine 110 are simple commands, such as, for example, turning devices (i.e., lights, appliances, TVs, etc.) ON and OFF, setting an alarm or a timer, unlocking or locking a door, etc. The specialized voice trigger ASR engine 110 resolves all commands and requests locally without cloud support.

Level 2 is the next level on the hierarchical structure 200. The ASR engine for Level 2 may be the audio digital signal processor (DSP) ASR engine 112, also known as an offload engine. The audio DSP ASR engine 112 may be embedded in silicon and may include compute power, memory, and access to the microphone 102. The audio DSP ASR engine 112 recognizes a vocabulary of a few hundred words. The audio DSP ASR engine 112 handles simple commands like those recited above in association with the specialized voice trigger ASR engine 110. The main difference between the specialized voice trigger ASR engine 110 and the audio DSP ASR engine 112 is the vocabulary. The audio DSP ASR engine 112 recognizes more vocabulary words than the specialized voice trigger ASR engine 110. The audio DSP ASR engine 112 resolves all commands and requests locally without cloud support.

Level 3 is the next level on the hierarchical structure 200. The ASR engine for Level 3 may be the local processor (e.g., central processing unit/CPU) based ASR engine 114. The processor based ASR engine 114 recognizes large vocabularies, and therefore, may resolve commands that the lower level ASR engines 110 and 112 do not have the vocabulary words to correctly decode and/or lack the information needed to respond to the request or command. The processor based ASR engine 114 may resolve such commands as "what time is my next meeting?" because the local processor has access to the user's calendar. It resolves all commands and requests locally without any cloud support.

Level 4 is the next level on the hierarchical structure 200. The ASR engine for Level 4 may be the cloud based ASR engine 116. The cloud based ASR engine 116 may be the highest level on the hierarchical structure 200. The cloud based ASR engine 116 includes very large vocabularies with practically unlimited processing and memory. To use the cloud based ASR engine 116 one must be connected to the Internet.

The policy and decision logic 108, used by a policy manager to decide what ASR level of the hierarchical structure to process the speech stream, is based on a plurality of factors used to determine the best ASR approach. The factors may include one or more of a confidence rating, privacy setting, user identity, system connection states, time of day, response time, and/or other factors that may be defined by the user of the system.

Confidence rating is a measure of how well an ASR engine decodes a speech stream. For example, a speech stream 104 is captured and sent to an ASR engine for decoding. If the ASR engine decodes the speech stream with little or no discrepancies between the spoken words and the decoded words, then the confidence rating is HIGH. If there are differences between the spoken words and the decoded words, then the confidence rating is LOW. If the confidence rating is below a pre-determined percentage for the decoded results from an ASR engine, the system will advance to the next higher level to allow an ASR engine with a larger vocabulary subsystem to decode the speech stream 104. If the confidence rating equals or exceeds a pre-determined percentage for the decoded results from an ASR engine, such as, for example, 85% or more confident that the speech stream 104 is decoded accurately, the speech stream 104 is considered to be properly decoded and the system will not advance to the next level ASR engine.

Figure 3:
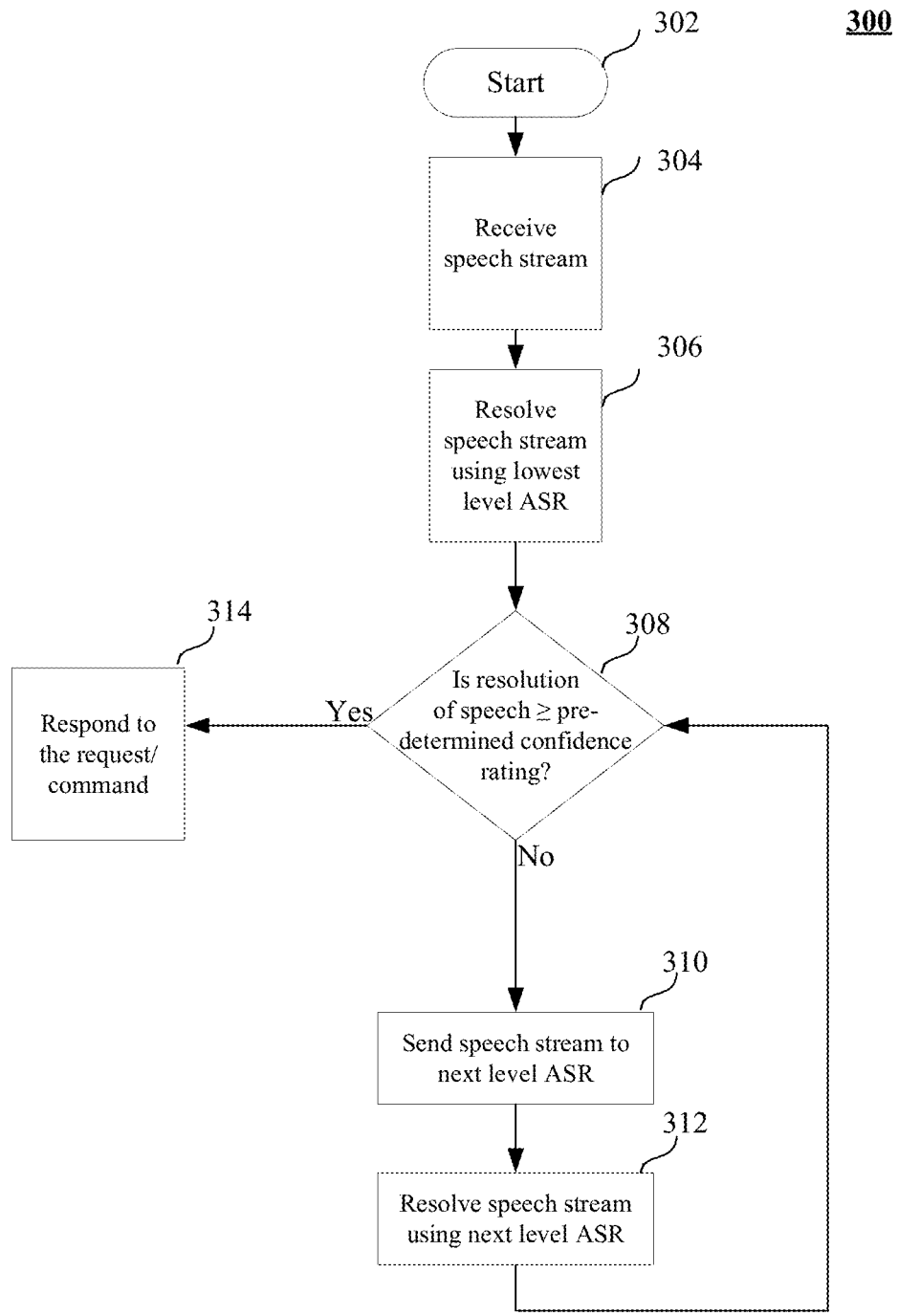
FIG. 3 is a flow diagram of an example method of determining the best ASR approach based on confidence rating according to an embodiment.

FIG. 3 is a flow diagram of an example method 300 for determining the best ASR approach based on confidence rating according to an embodiment. The method 300 may generally be implemented in a system such as, for example, the hierarchical ASR system 100 as shown in FIG. 1. More particularly, the method 300 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), and fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 300 may be written in any combination of one or more programming languages, including an object-oriented programming language such as JAVA, SMALLTALK, C++ or the like and conventional procedural programming languages, such as the "C" programming language or similar programming languages. Additionally, logic instructions might include assembler instruction, instruction set architecture (ISA) instructions, machine instruction, machine depended instruction, microcode, state setting data, configuration data for integrated circuitry, state information that personalizes electronic circuitry and/or other structural engines that are native to hardware (e.g., host processor, central processing unit (CPU), microcontroller, etc.).

The process begins in block 302, where the process immediately proceeds to block 304.

In block 304, a speech stream is received. The speech stream may include a trigger and/or a request or command. As previously indicated, the trigger may be a voice trigger or a control button. The process then proceeds to block 306.

In block 306, the lowest level ASR attempts to resolve the speech stream. The process then proceeds to decision block 308.

In decision block 308, it is determined whether the speech stream was properly resolved. If the speech stream was properly resolved, the process proceeds to block 314.

In block 314, a response to the request or command from the speech stream may be provided to the user. The process then proceeds back to block 304 to receive another speech stream.

Returning to decision block 308, if it is determined that the speech stream could not be properly resolved by the current level ASR, the speech stream is sent to the next level ASR in block 310. The process then proceeds to block 312.

In block 312, the next level ASR attempts to resolve the speech stream. The process then proceeds back to decision block 308 to determine whether the speech stream was properly resolved by the next level ASR. If the speech stream is not properly resolved, the process repeats from blocks 310 to 312 until the speech stream is properly resolved.

Returning to the policy and decision logic 108 in FIG. 1, another policy and decision logic factor that may affect what level ASR resolves the speech stream is privacy setting. Privacy setting is a policy that prevents specific speech from going to the cloud, thus, causing all data to remain local and private. Other policy and decision factors that may require use of the privacy setting include user identity and time of day. User identity may require the use of the privacy setting based on the identity of the user. For example, a parent may want to preserve the privacy of all speech spoken by their child/children. In this instance, a privacy setting for each child is set to prevent any speech spoken by the children to go to the cloud. Any speech spoken by any of the children will be resolved locally. In another example, a user may want to preserve privacy of their own speech during certain times of the day. In this instance, a privacy setting for the user is set to prevent any speech spoken by the user to go to the cloud during certain times of the day, such as, for example, the hours from 9 pm to 11 pm or any speech spoken during nighttime hours. Any speech spoken by the user will be resolved locally between the hours of 9 pm and 11 pm or during nighttime hours.

Another policy and decision logic factor depends on system connection states, such as, for example, connection to the Internet, connection to power, and battery level when the system is operating on battery power. If the system is not connected to the Internet, then the system will not be able to resolve the speech stream using the cloud based ASR engine 116. If the system is connected to the Internet, but the speech stream can be resolved at a local level, for example, one of Levels 1, 2, or 3 (shown in FIG. 2), then the speech stream will be resolved at an optimal local level. That is, the lowest local level in which the speech stream may be resolved by detecting the vocabulary and having the information needed to respond to the request or command from the speech stream. If the system is connected to the Internet, and the speech stream cannot be resolved at a local level due to limited vocabulary or additional data being needed to perform the action on a voice command, then the speech stream will be resolved using the cloud based ASR engine 116 (if there is no privacy policy to prevent use of the cloud based ASR engine 116).

When the system is connected to power and to the Internet, the speech stream may be resolved at the lowest level ASR that will resolve the speech and perform the action required in the voice command. If the speech cannot be resolved locally or the action required cannot be performed with local resources, then the speech stream will be resolved using the cloud based ASR 116 (if there is no privacy policy that prevents use of the cloud based ASR engine 116). When the system is connected to power, but not to the Internet, the speech stream may be resolved locally at the lowest level ASR that will resolve the speech and perform the action required in the voice command.

Figure 4A:
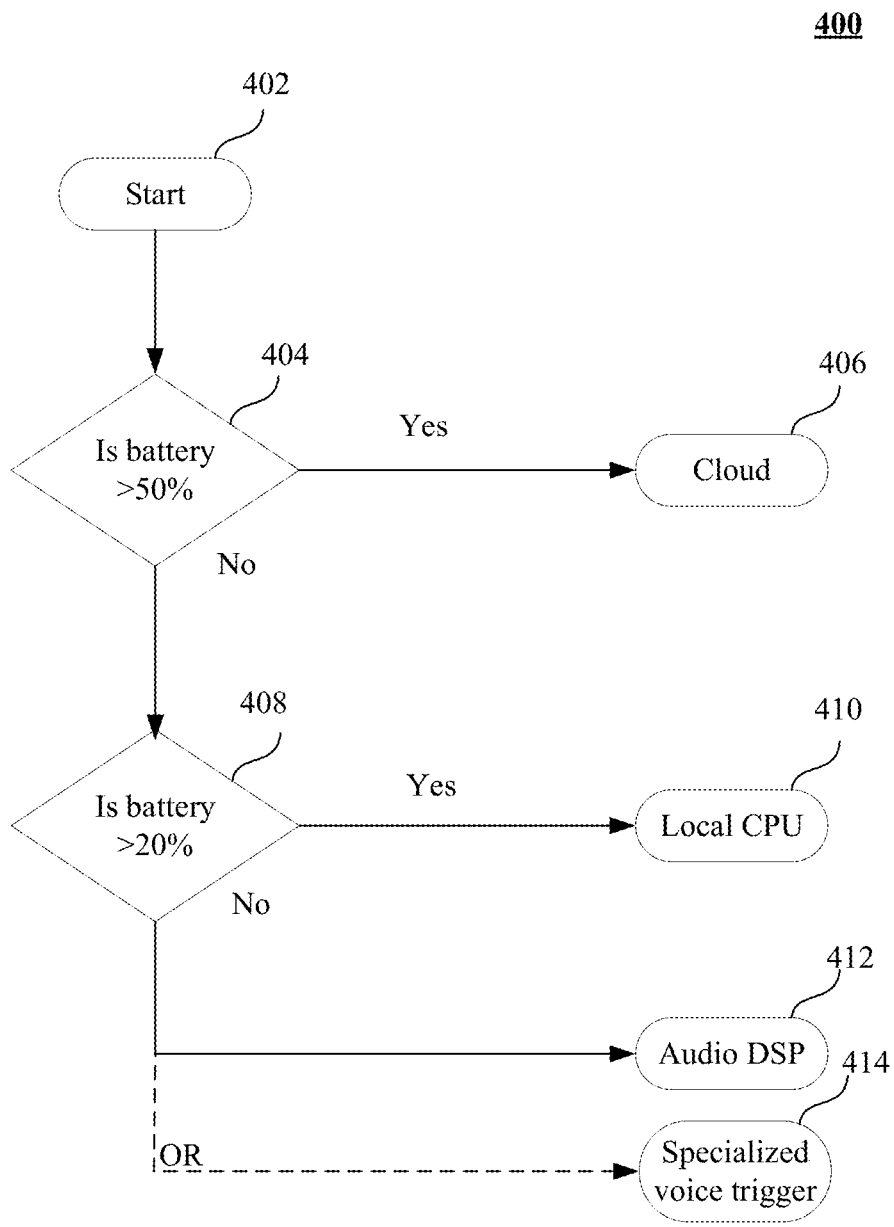
FIG. 4A is a flow diagram for an example method to prolong battery life when resolving which level ASR engine will perform speech recognition according to an embodiment.

When the system is unplugged, battery power may be a concern. In one embodiment, the policy may be to resolve the speech stream at the lowest power level. FIG. 4A is a flow diagram for an example method 400 to prolong battery life when determining which level ASR engine will perform speech recognition according to an embodiment. The method 400 may generally be implemented in a system such as, for example, the hierarchical ASR system 100 as shown in FIG. 1. More particularly, the method 400 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, and fixed-functionality logic hardware using circuit technology such as, for example, ASIC, CMOS or TTL technology, or any combination thereof.

The example method 400 assumes that the energy of sending and receiving from the cloud is larger than that of local processor processing, and that local processor processing consumes more power than audio DSP processing or specialized voice trigger processing. In other embodiments, the policy and decision logic corresponding to connection state, power, and privacy may be different.

The process begins in block 402, where the process immediately proceeds to decision block 404. In decision block 404, it is determined whether the battery life is greater than 50%. If the battery life is greater than 50%, the cloud based ASR engine 116 may be used to resolve the speech stream. Note that although the cloud based ASR engine 116 may be used to resolve the speech stream, if the speech stream may be resolved at a lower level, then the speech stream will be resolved at the lowest level possible. In other words, just because the battery life is greater than 50% does not mean that the speech stream must be resolved using the cloud based ASR engine 116. To the contrary, the speech stream may be resolved using the lowest possible level ASR engine that adheres to the pre-defined policies of the system. If the battery life is less than or equal to 50%, the process proceeds to decision block 408.

In decision block 408, it is determined whether the battery life is greater than 20%. If the battery life is greater than 20%, the local processor based ASR engine 114 may be used to resolve the speech stream. Note that although the local processor based ASR engine 114 may be used to resolve the speech stream at a battery life greater than 20% but less than 50%, if the speech stream may be resolved at a lower level ASR engine, then the speech stream will be resolved at the lowest possible level. In other words, the speech stream may be resolved using the lowest possible level ASR engine that adheres to the pre-defined policies of the system. If the battery life is less than or equal to 20%, the audio DSP ASR engine 112 or the specialized voice trigger ASR engine 110 may be used to resolve the speech stream. Again, the system will select the lowest possible level ASR engine that adheres to the pre-defined policies of the system.

Note that the percentages of battery power used and the ASR engine level invoked based on the percentages of battery power in the example flow diagram of FIG. 4A are used for illustrative purposes only. As previously stated, the policy and decision logic corresponding to connection state, power, and privacy may be different for different users. For example, in another embodiment, a user may want to proceed directly to the cloud based ASR engine when the battery power is 20% or greater. Another user may want to only process speech streams locally, even when his battery power exceeds 75% because he needs his battery to last all day without having to be recharged.

Returning to the policy and decision logic 108 of FIG. 1, another policy and decision logic factor may include response time. In cases where a response is required quickly, processing the speech stream locally may result in lower latency and faster response times. If a quick response (e.g., a response that is less than a threshold) is not required, processing the speech stream in the cloud may provide better accuracy.

There are other policy and decision logic 108 factors that may be taken into consideration when resolving speech streams at lower or higher ASR levels. One such factor is the availability of data to perform the action required. Simple commands, such as, for example, "turn on the light" or "turn off the light", do not require data from the cloud to perform the action of turning on or turning off the light. Such commands may be performed locally using the specialized trigger ASR engine 110, the audio DSP ASR engine 112, or the local processor based ASR engine 114, and do not require additional data to perform the action. If the command requires information such as, for example, "what time is my meeting tomorrow?", the specialized trigger ASR engine 110 and the audio DSP ASR engine 112 do not have access to the user's calendar, but the local processor based ASR engine 114 has access to the user's calendar, and therefore can perform the action required. If the command requires information such as, for example, "what time are flights to Denver, Colorado on American Airlines tomorrow?" or "what is the temperature in New York City?", this type of information requires data to be retrieved from the Internet, and thus, can only be performed by the cloud based ASR engine 116. In this instance, the policy and decision logic will elevate to the highest-level ASR engine to enable performance of the action required. In another embodiment, the system may use the cloud based ASR engine 116 for data retrieval only, and allow the speech stream 104 to be resolved locally using the lowest level ASR engine that is capable of decoding the speech stream with HIGH confidence.

The output 118 may be a voice response, such as, for example, a relay of information or a confirmation of a particular action. In embodiments, the output may not always be a voice response, but could be an action response. For example, if the command was to "turn on the kitchen lights", the turning ON of the kitchen lights is an action response affirming that the kitchen lights have been turned ON.

Figure 4B:
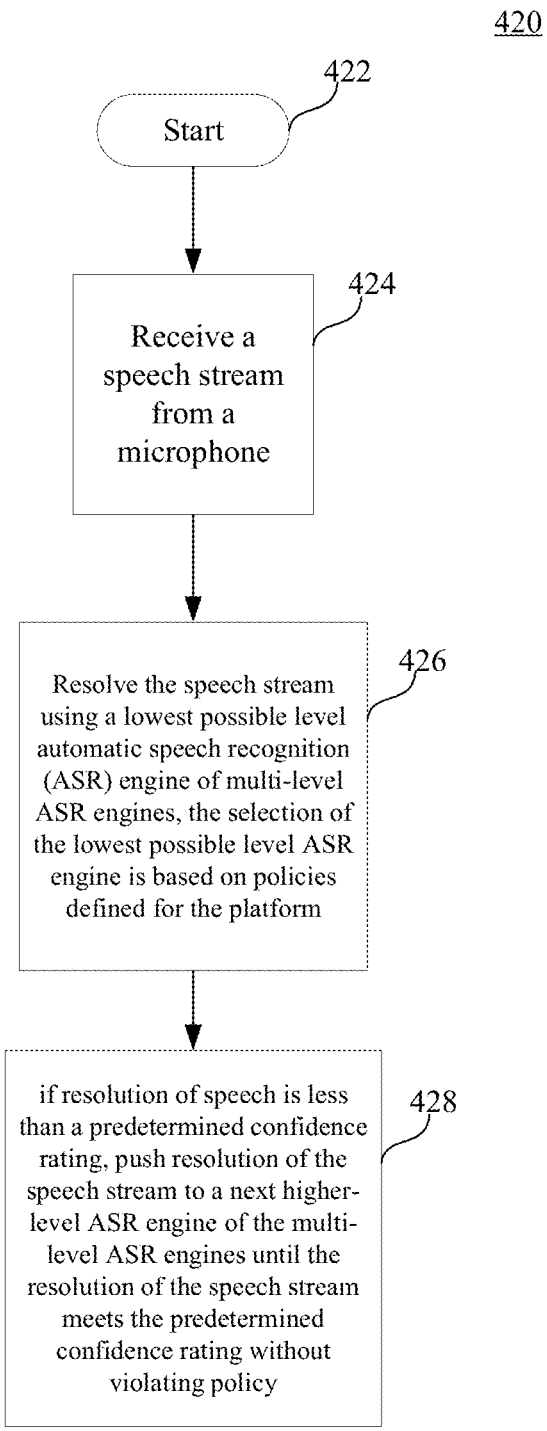
FIG. 4B is a flow diagram of an example method of performing hierarchical level ASR resolution based on policy and decision logic according to an embodiment.

FIG. 4B is a flow diagram of an example method 420 for performing hierarchical level ASR resolution based on policy and decision logic according to an embodiment. The method 420 may generally be implemented in a system such as, for example, the hierarchical ASR system 100 as shown in FIG. 1. More particularly, the method 420 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, and fixed-functionality logic hardware using circuit technology such as, for example, ASIC, CMOS or TTL technology, or any combination thereof.

The process begins in block 422, where the process immediately proceeds to block 424. In block 424, a speech stream is received. The speech stream is received from a microphone. In one embodiment, the microphone may be a digital microphone. The process then proceeds to block 426.

In block 426, the speech stream is resolved using a lowest possible level automatic speech recognition (ASR) engine of multi-level ASR engines that provides the vocabulary to correctly decode the speech stream and the necessary information to respond to a request in the speech stream. The lowest possible level ASR engine is selected based on policies defined for the platform. The multi-level ASR engines are hierarchically structured to provide more compute power and word recognition with each higher-level ASR engine. The process then proceeds to block 428.

In block 428, if the resolution of the speech stream is less than a predetermined confidence rating, resolution of the speech stream is pushed to the next higher-level ASR engine of the multi-level ASR engines until the resolution of the speech stream meets the predetermined confidence rating without violating any policies. The defined policies may include, but is not limited to, confidence rating, privacy setting, user identity, system connection states, time of day, response time, and availability of data to perform a requested action or use.

Figure 5A:
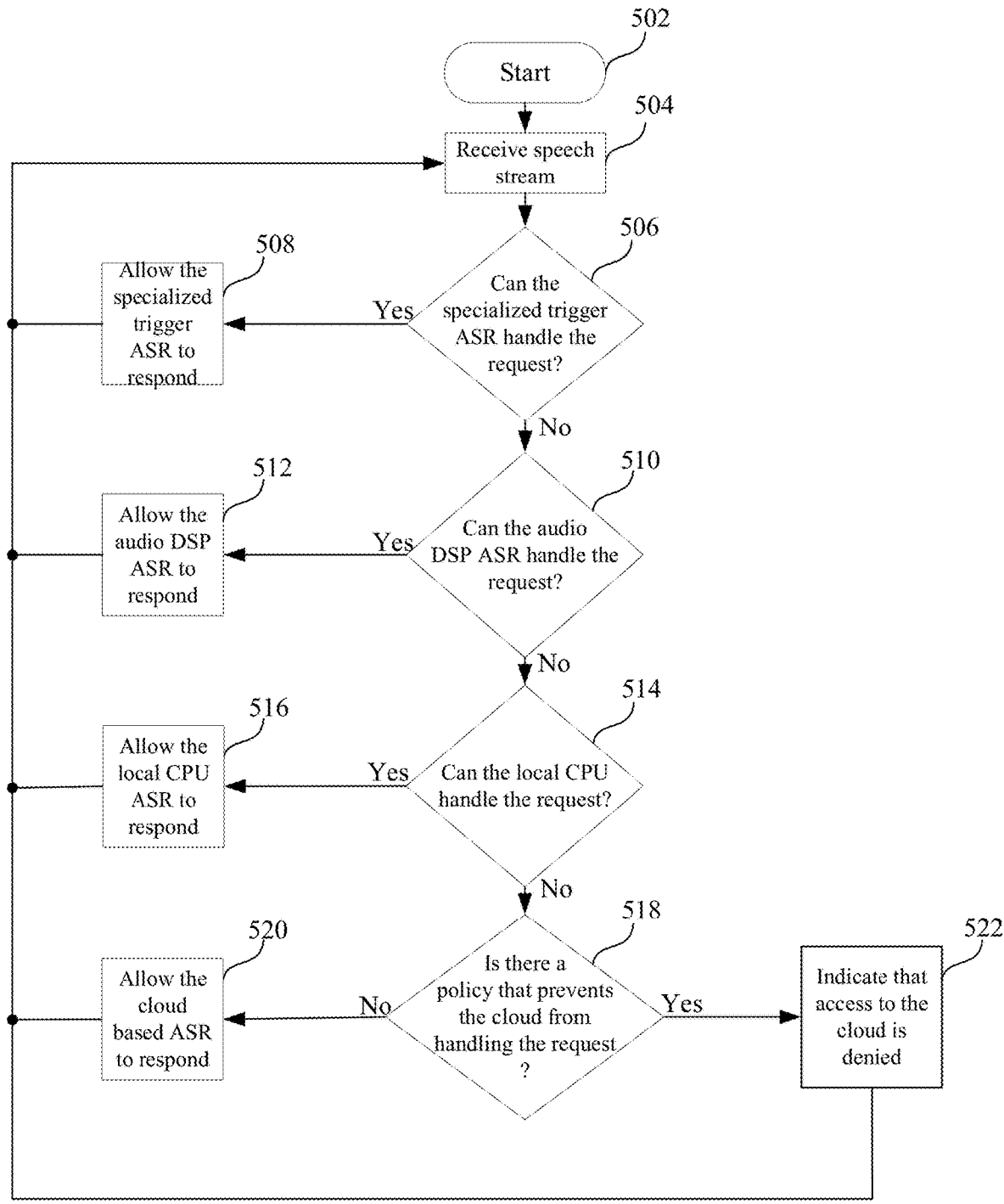
FIG. 5A is a flow diagram of an example method of determining which hierarchical level ASR engine to use based on the policy and decision logic according to an embodiment.

FIG. 5A is a flow diagram of an example method 500 for determining which hierarchical level ASR engine to use based on the policy and decision logic according to an embodiment. The method 500 may generally be implemented in a system such as, for example, the hierarchical ASR system 100 as shown in FIG. 1. More particularly, the method 500 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, and fixed-functionality logic hardware using circuit technology such as, for example, ASIC, CMOS or TTL technology, or any combination thereof.

The process begins in block 502, where the process proceeds to block 504. In block 504, a speech stream is received. The process then proceeds to decision block 506.

In decision block 506, it is determined whether the specialized trigger ASR can handle the request by resolving the speech stream and having the ability to act upon the request. If the specialized trigger ASR engine 110 can handle the request, then the process proceeds to block 508.

In block 508, the specialized trigger ASR engine 110 may respond to the request. The process then returns to block 504 to receive a speech stream.

Returning to decision block 506, if the specialized trigger ASR engine 110 cannot handle the request, the process proceeds to decision block 510. In decision block 510, it is determined whether the audio DSP ASR engine 112 can handle the request. If the audio DSP ASR engine 112 can handle the request by resolving the speech stream and having the ability to act upon the request, the process proceeds to block 512.

In block 512, the audio DSP ASR engine 112 may respond to the request. The process then returns to block 504 to receive a speech stream.

Returning to decision block 510, if the audio DSP ASR engine 112 cannot handle the request, the process proceeds to decision block 514. In decision block 514, it is determined whether the local processor ASR engine 114 can handle the request. If the local processor ASR engine 114 can handle the request by resolving the speech stream and having the ability to act upon the request, the process proceeds to block 516.

In block 516, the local processor ASR engine 114 may respond to the request. The process then returns to block 504 to receive a speech stream.

Returning to decision block 514, if the local processor ASR engine 114 cannot handle the request, the process proceeds to decision block 518. In decision block 518, it is determined whether there is a policy that prevents the cloud based ASR engine 116 from handling the request. Such policies may include, but are not limited to, a privacy setting policy in which the user is indicated as a person that is not allowed to access the cloud, a privacy setting policy in which the user has requested certain times of the day in which access to the cloud is not allowed, a system connection state that indicates the system is not connected to the Internet, a system connection state in which the system is being operated by battery and the battery level is less than 50%, and/or a response time policy in which a response is required quickly. If there are no policies that would prevent the system from accessing the cloud, then the process proceeds to block 520.

In block 520, the cloud based ASR engine 116 may respond to the request. The process then returns to block 504 to receive a speech stream.

Returning to decision block 518, if there are one or more policies that would prevent the system from accessing the cloud, then the process proceeds to block 522. In block 522, the system will provide an indication to the user to indicate that the request cannot be fulfilled due to restricted access to the cloud. The process then returns to block 504 to receive a speech stream.

Figure 5B:
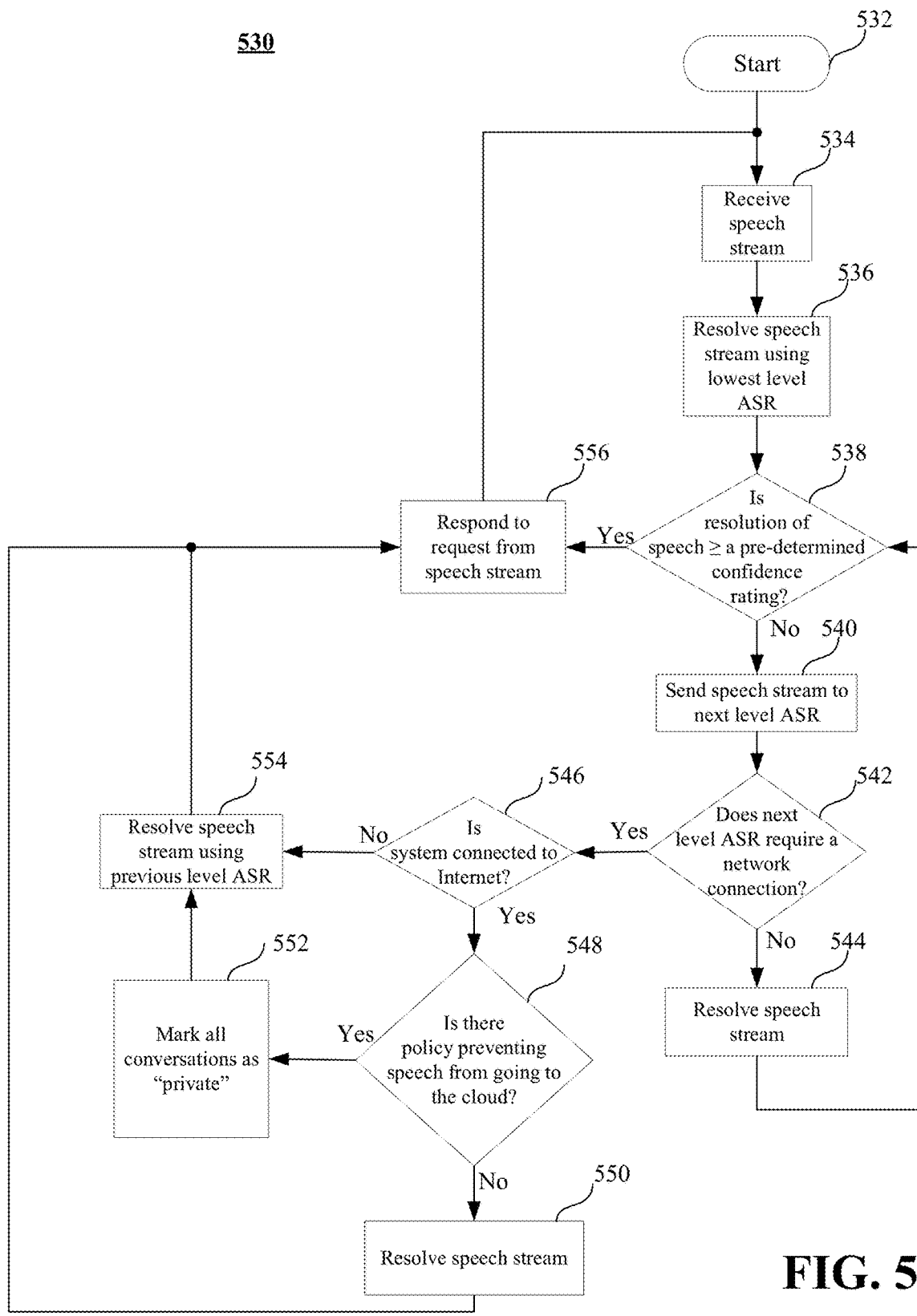
FIG. 5B is a flow diagram of another example method of determining which hierarchical level ASR engine to use based on the policy and decision logic according to an embodiment.

FIG. 5B is a flow diagram of another example method 530 for determining which hierarchical level ASR engine to use based on the policy and decision logic according to an embodiment. The method 530 may generally be implemented in a system such as, for example, the hierarchical ASR system 100 as shown in FIG. 1. More particularly, the method 530 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, and fixed-functionality logic hardware using circuit technology such as, for example, ASIC, CMOS or TTL technology, or any combination thereof.

The process begins in block 532, where the process immediately proceeds to block 534. In block 534, a speech stream is received. The process then proceeds to block 536.

In block 536, the system resolves the speech stream using the lowest level ASR. In the instant case, the lowest level ASR is the specialized voice trigger ASR engine 110. The process then proceeds to decision block 538.

In decision block 538, it is determined whether the resolution of speech is greater than or equal to a predetermined confidence rating. In one embodiment, the predetermined confidence rating may be at least 85% or better. If the speech is equal to or greater than the predetermined confidence rating, then the process proceeds to block 556.

In block 556, a response to the request from the speech stream is provided using the current level ASR. The process then proceeds back to block 534 to receive a speech stream.

Returning to decision block 538, if it is determined that the resolution of speech is less than the predetermined confidence rating, the speech stream is pushed to the next level ASR in block 540. The process then proceeds to decision block 542.

In decision block 542 it is determined whether the next level ASR requires a network connection. If the next level ASR does not require a network connection, the process proceeds to block 544.

In block 544, the speech stream is resolved using the next level ASR. The process then proceeds back to decision block 538 to determine whether the resolution of speech is greater than or equal to the predetermined confidence rating.

Returning to decision block 542, if the next level ASR does require a network connection, the process proceeds to decision block 546. In decision block 546 it is determined whether the system is connected to the Internet. If the system is not connected to the Internet, the process proceeds to block 554.

In block 554, the speech stream is pushed back to the previous level ASR to resolve the speech stream. The process then proceeds to block 556 where a response to the request from the speech stream is provided via the previous level ASR. The process then returns to block 534 to receive a speech stream.

Returning to decision block 546, if the system is connected to the Internet, the process then proceeds to decision block 548. In decision block 548, it is determined whether there are one or more policies preventing speech from going to the cloud. Such policies may include, but are not limited to, a privacy setting policy in which the user is indicated as a person that is not allowed to access the cloud, a privacy setting policy in which the user has requested certain times of the day in which access to the cloud is not allowed, a system connection state that indicates the system is not connected to the Internet, a system connection state in which the system is being operated by battery and the battery level is less than 50%, and/or a response time policy in which a response is required quickly. If there are no policies that would prevent speech from going to the cloud, then the process proceeds to block 550.

In block 550, the speech stream is resolved by a cloud based ASR engine, such as, for example, cloud based ASR engine 116. The process then proceeds to block 556 where a response to the request from the speech stream is provided via the cloud. The process then proceeds back to block 534 to receive a speech stream.

Returning to decision block 548, if there are one or more policies preventing speech from going to the cloud, the process moves to block 552. In block 552, all conversations are marked "private". The process then proceeds to block 554.

In block 554, the speech stream is pushed back to the previous level ASR to resolve the speech stream. The process then proceeds to block 556 where a response to the request from the speech stream is provided via the previous level ASR. The process then returns to block 534 to receive a speech stream.

Figure 6:
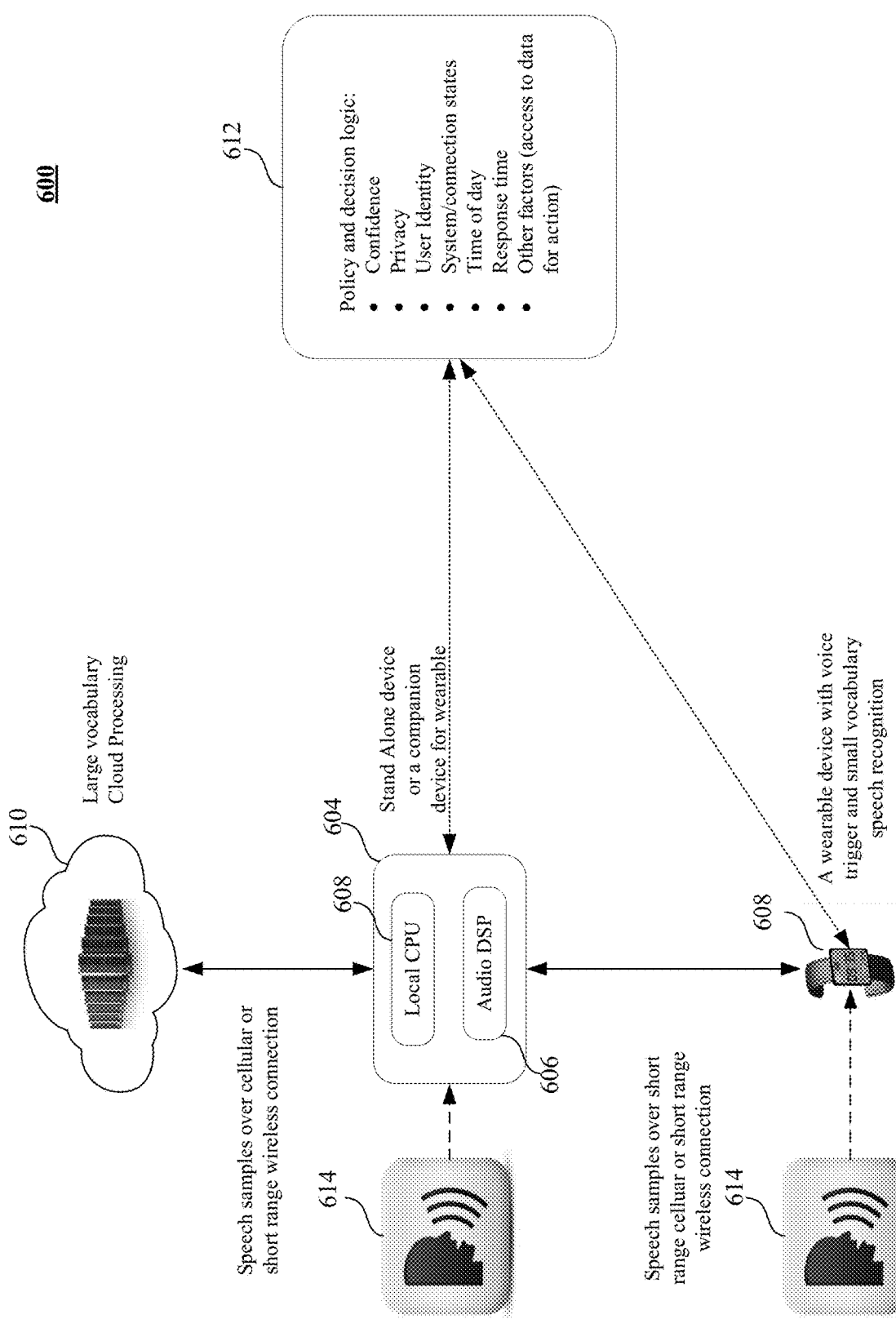
FIG. 6 is a block diagram illustrating example hierarchical levels of ASR processing in the context of a wearable device according to an embodiment.

FIG. 6 is a block diagram 600 illustrating hierarchical levels of ASR processing in the context of a wearable device according to an embodiment. Diagram 600 includes a wearable device 602, a stand-alone/companion device for wearables 604, and a cloud 610. The wearable device 602 may be, for example, a smart watch and the stand-alone/companion device for wearables 604 may be, for example, a smart phone or a smart tablet. Diagram 600 also includes policy and decision logic 612, described above with reference to FIG. 1, to manage the selection of the appropriate hierarchical ASR level to process the speech commands.

As shown in diagram 600, ASR processing may be done at different levels of hierarchy. The wearable device 602 may have a voice trigger ASR engine (not shown) capable of recognizing a limited amount of key words. In one embodiment, the wearable device 602 may also have an offload engine, such as an audio DSP ASR engine, with vocabularies of a hundred words or more. The stand-alone device or companion device for wearables 604 may have both an audio DSP ASR engine 606 and a local processor ASR engine 608. The cloud 610 may have a cloud based ASR engine 611 with a very large vocabulary.

Simple commands, such as those coming from a user 614, to the wearable device in which the information needed to take action is local to the wearable device may include "start the stop watch", "stop the stop watch", what is my heart rate?", "set an alarm for 6 am", or any other simple command in which no additional data is required for the wearable device to act upon the request. Simple voice commands that can be resolved locally help to save power, preserve speech privacy, and result in faster response times and low latency because it prevents the speech data from being sent to the cloud for processing.

If the command spoken by the user 614 to the wearable device 602 requires information that is not available to the wearable device 602, the command is pushed to the stand alone or companion device 604 for resolution locally using either the audio DSP ASR engine 606 or the local processor ASR engine 608. Again, if the command can be resolved locally on the stand alone or companion device 604, less power is used, speech privacy is preserved, response times are faster and latency is lower than sending the speech data to the cloud for processing.

If a command spoken by the user 614 to the wearable device 602 cannot be processed by the stand alone or companion device 604 due to inadequate processing power and/or the lack of information needed to act, the speech data is streamed to the cloud 610 for processing by the cloud based ASR engine 611.

Figure 7:
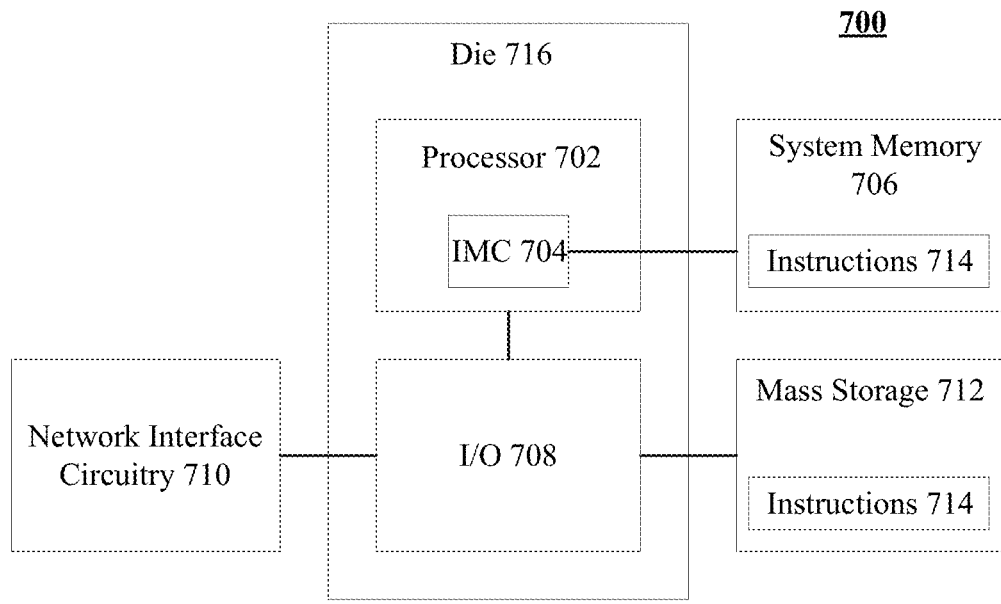
FIG. 7 is a system that may be readily substituted for the hierarchial speech recognition system shown in FIG. 1 according to an embodiment.

FIG. 7 shows a system 700 that may be readily substituted for the hierarchical speech recognition system shown above with reference to FIG. 1. The illustrated system 700 includes a processor 702 (e.g., host processor, central processing unit/CPU) having an integrated memory controller (IMC) 704 coupled to a system memory 706 (e.g., volatile memory, dynamic random access memory/DRAM). The processor 702 may also be coupled to an input/output (I/O) module 708 that communicates with network interface circuitry 710 (e.g., network controller, network interface card/NIC) and mass storage 712 (non-volatile memory/NVM, hard disk drive/HDD, optical disk, solid state disk/SSD, flash memory). The network interface circuitry 710 may receive speech streams via a digital microphone such as, for example, microphone 102 (shown in FIG. 1), wherein the system memory 706 and/or the mass storage 712 may be memory devices that store instructions 714, which when executed by the processor 702, cause the system 700 to perform one or more aspects of the method 300 (FIG. 3), the method 400 (FIG. 4), and the method 500 (FIG. 5) already discussed. Thus, execution of the instructions 714 may cause the system 700 to resolve the speech stream at a lowest possible level of multi-level automatic speech recognition (ASR) engines hierarchically structured to provide more compute power and word recognition with each higher-level ASR engine. A policy manager may push resolution of the speech stream to a hierarchical level of the multi-level ASR engines capable of resolving the speech stream based on policies defined for the system. The processor 702 and the IO module 708 may be incorporated into a shared die 716 as a system on chip (SoC).

Figure 8:
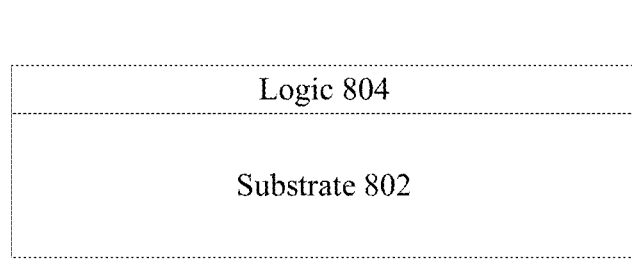
FIG. 8 is an illustration of an example of a semiconductor package apparatus according to an embodiment.

FIG. 8 shows a semiconductor package apparatus 800 (e.g., chip) that includes a substrate 802 (e.g., silicon, sapphire, gallium arsenide) and logic 804 (e.g., transistor array and other integrated circuit/IC engines) coupled to the substrate 802. The logic 804, which may be implemented in configurable logic and/or fixed-functionality logic hardware, may generally implement one or more aspects of the method 300 (FIG. 3), the method 400 (FIG. 4), and the method 500 (FIG. 5) already discussed.

Figure 9:
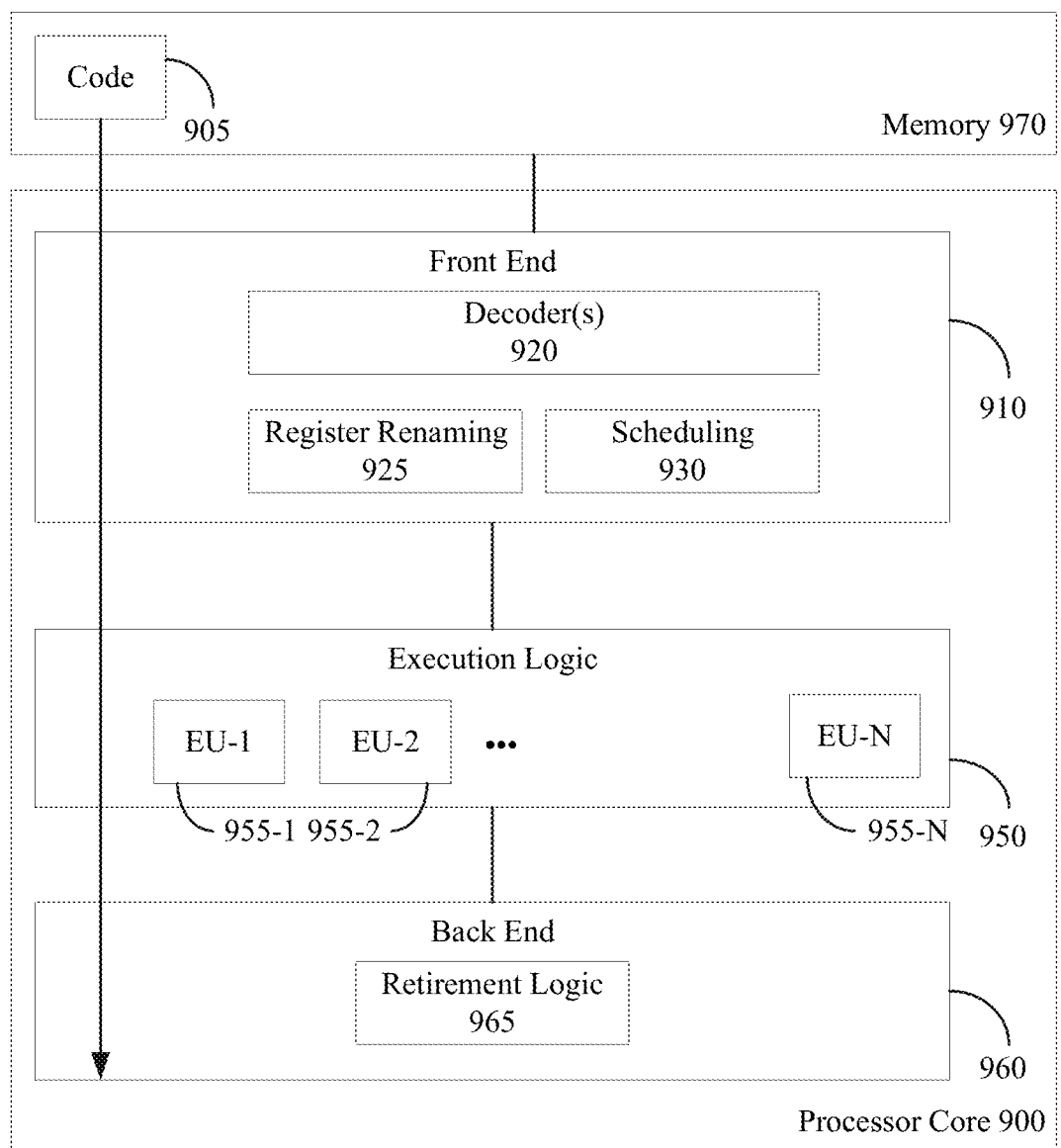
FIG. 9 is a block diagram of an exemplary processor according to an embodiment.

FIG. 9 illustrates a processor core 900 according to one embodiment. The processor core 900 may be the core for any type of processor, such as a micro-processor, an embedded processor, a digital signal processor (DSP), a network processor, or other device to execute code. Although only one processor core 900 is illustrated in FIG. 9, a processing element may alternatively include more than one of the processor core 900 illustrated in FIG. 9. The processor core 900 may be a single-threaded core or, for at least one embodiment, the processor core 900 may be multithreaded in that it may include more than one hardware thread context (or "logical processor") per core.

FIG. 9 also illustrates a memory 970 coupled to the processor core 900. The memory 970 may be any of a wide variety of memories (including various layers of memory hierarchy) as are known or otherwise available to those of skill in the art. The memory 970 may include one or more code 905 instruction(s) to be executed by the processor core 900, wherein the code 905 may implement the method 400 (FIG. 4), the method 400 (FIG. 4) and the method 500 (FIG. 5), already discussed. The processor core 900 follows a program sequence of instructions indicated by the code 905. Each instruction may enter a front end portion 910 and be processed by one or more decoders 920. The decoder 920 may generate as its output a micro operation such as a fixed width micro operation in a predefined format, or may generate other instructions, microinstructions, or control signals which reflect the original code instruction. The illustrated front end portion 910 also includes register renaming logic 925 and scheduling logic 930, which generally allocate resources and queue the operation corresponding to the convert instruction for execution.

The processor core 900 is shown including execution logic 950 having a set of execution units 955-1 through 955-N. Some embodiments may include a number of execution units dedicated to specific functions or sets of functions. Other embodiments may include only one execution unit or one execution unit that can perform a particular function. The illustrated execution logic 950 performs the operations specified by code instructions.

After completion of execution of the operations specified by the code instructions, back end logic 960 retires the instructions of the code 905. In one embodiment, the processor core 900 allows out of order execution but requires in order retirement of instructions. Retirement logic 965 may take a variety of forms as known to those of skill in the art (e.g., re-order buffers or the like). In this manner, the processor core 900 is transformed during execution of the code 905, at least in terms of the output generated by the decoder, the hardware registers and tables utilized by the register renaming logic 925, and any registers (not shown) modified by the execution logic 950.

Although not illustrated in FIG. 9, a processing element may include other elements on chip with the processor core 900. For example, a processing element may include memory control logic along with the processor core 900. The processing element may include I/O control logic and/or may include I/O control logic integrated with memory control logic. The processing element may also include one or more caches.

Figure 10:
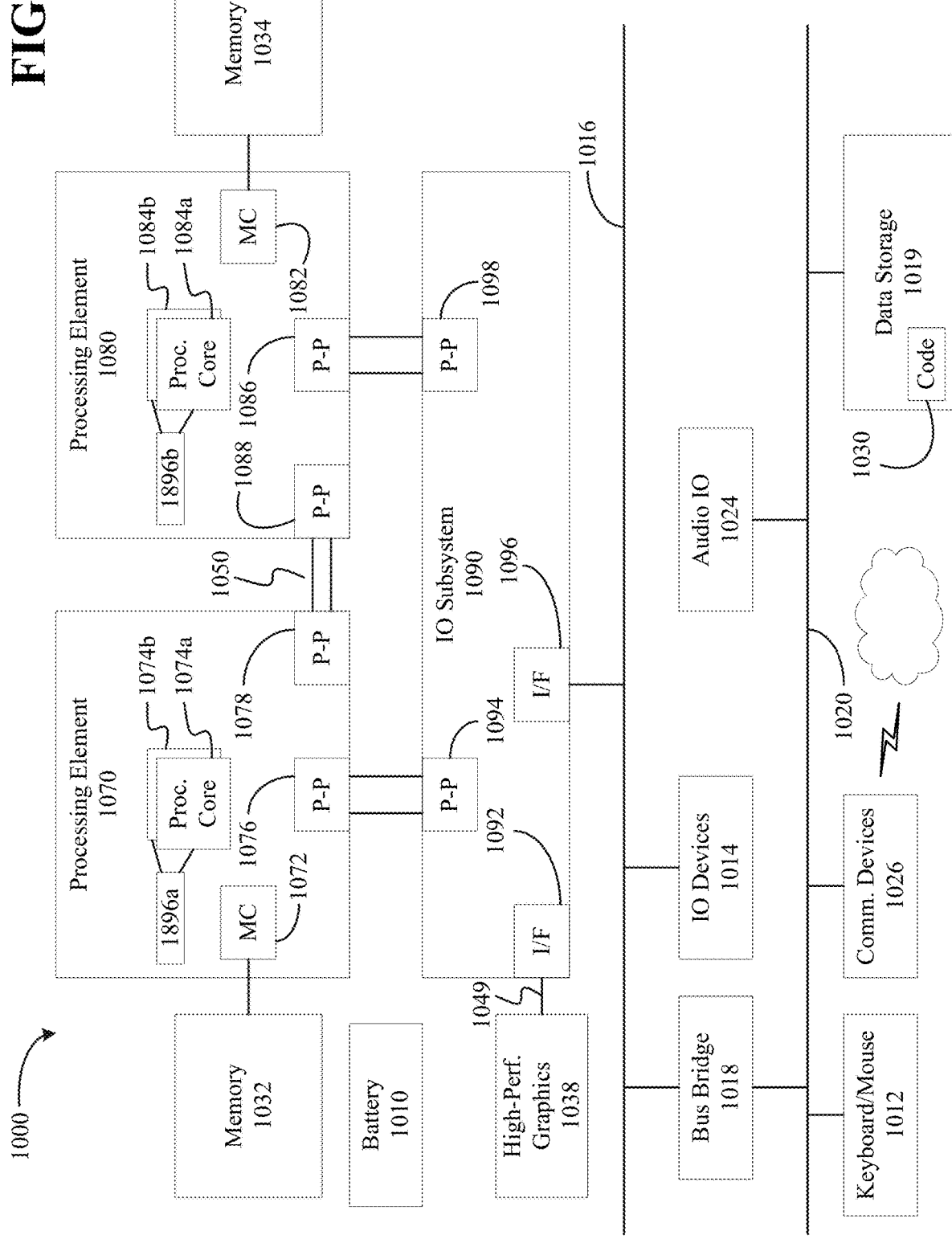
FIG. 10 is a block diagram of an exemplary computing system according to an embodiment.

Referring now to FIG. 10 shown is a block diagram of a computing system 1000 in accordance with an embodiment. Shown in FIG. 10 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 10 may be implemented as a multi-drop bus rather than point-to-point interconnect.

As shown in FIG. 10, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 9.

Each processing element 1070, 1080 may include at least one shared cache 1096a, 1096b. The shared cache 1096a, 1096b may store data (e.g., instructions) that are utilized by one or more engines of the processor, such as the cores 1074a, 1074b and 1084a, 1084b, respectively. For example, the shared cache 1096a, 1096b may locally cache data stored in a memory 1032, 1034 for faster access by engines of the processor. In one or more embodiments, the shared cache 1096a, 1096b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 10, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076, 1086, respectively. As shown in FIG. 10, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these engines.

In turn, I/O subsystem 1090 may be coupled to a first bus 1016 via an interface 1096. In one embodiment, the first bus 1016 may be a Peripheral Engine Interconnect (PCI) bus, or a bus such as a PCI Express bus or another third generation I/O interconnect bus, although the scope of the embodiments are not so limited.

As shown in FIG. 10, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 300 (FIG. 3), the method 400 (FIG. 4), and the method 500 (FIG. 5), already discussed, and may be similar to the code 905 (FIG. 9), already discussed. Further, an audio I/O 1024 may be coupled to second bus 1020 and a battery 1010 may supply power to the computing system 1000.

Note that other embodiments are contemplated. For example, instead of the point-to-point architecture of FIG. 10, a system may implement a multi-drop bus or another such communication topology. Also, the elements of FIG. 10 may alternatively be partitioned using more or fewer integrated chips than shown in FIG. 10.

ADDITIONAL NOTES AND EXAMPLES

Example 1 may include a platform having hierarchical speech resolution, comprising network interface circuitry to receive a speech stream from a microphone, a processor coupled to the network interface circuitry, one or more memory devices coupled to the processor, the one or more memory devices including instructions, which when executed by the processor, cause the platform to resolve the speech stream using a lowest possible level automatic speech recognition (ASR) engine of multi-level ASR engines, wherein selection of the lowest possible level ASR engine is based on policies defined for the platform, and if resolution of speech is less than a predetermined confidence rating, push resolution of the speech stream to a next higher-level ASR engine of the multi-level ASR engines until the resolution of the speech stream meets the predetermined confidence rating without violating one or more policies.

Example 2 may include the platform of Example 1, wherein the multi-level ASR engines comprise a hierarchical structure to provide more compute power and word recognition with each higher-level ASR engine.

Example 3 may include the platform of Example 1, wherein the multi-level ASR engines include two or more levels, each of the two or more levels having an ASR engine for resolving speech.

Example 4 may include the platform of Example 1, wherein the multi-level ASR engines include an audio digital signal processor (DSP) based ASR engine having a vocabulary of a few hundred words, a local processor based ASR engine having a large vocabulary, and a cloud based ASR engine having a very large vocabulary with unlimited processing and memory.

Example 5 may include the platform of Example 1, wherein the multi-level ASR engines include a voice trigger based ASR engine for limited keywords and a vocabulary set of 30-40 words, an audio digital signal processor (DSP) based ASR engine having a vocabulary of a few hundred words, a local processor based ASR engine having a large vocabulary, and a cloud based ASR engine having a very large vocabulary with unlimited processing and memory.

Example 6 may include the platform of Example 2, wherein the hierarchical structure of the multi-level ASR engines comprises additional processing power and a larger vocabulary for each higher-level ASR engine of the multi-level ASR engines.

Example 7 may include the platform of Example 1, wherein the confidence rating indicates how well an ASR engine resolved the speech stream, wherein if accuracy of the resolved speech stream is below a predefined level, the instructions, when executed, are to push resolution of the speech stream to the next higher-level ASR engine, wherein the next higher-level ASR engine includes more compute power and a larger vocabulary subsystem.

Example 8 may include the platform of Example 7, wherein if the accuracy of the resolved speech stream is equal to or exceeds the predefined level, the instructions, when executed, are to accept the resolution of the speech stream without pushing resolution of the speech stream to the next higher-level ASR engine.

Example 9 may include the platform of Example 1, wherein the one or more policies include the confidence rating, a privacy setting, user identity, system connection states, time of day, response time, and other indicators requiring resolution of the speech stream at lower-level or higher-level ASR engines.

Example 10 may include the platform of Example 9, wherein the privacy setting prevents specific speech from going to a cloud based ASR engine, wherein all data remains local to the platform.

Example 11 may include the platform of Example 9, wherein a policy for the user identity enables rules set by a user, an owner, or both the user and the owner of the platform, and wherein a policy for the privacy setting and the time of day are based on an identity of the user.

Example 12 may include the platform of Example 9, wherein the system connection states include connection to an Internet, connection to power, and a battery level of the platform.

Example 13 may include the platform of Example 9, wherein the response time includes rules that require a response that is less than a threshold.

Example 14 may include the platform of Example 9, wherein the other indicators comprise availability of data to perform an action or a use.

Example 15 may include the platform of Example 1, wherein lower-level ASR engines are to perform resolution of the speech stream locally without retrieving data from a cloud.

Example 16 may include the platform of Example 1, wherein a highest-level ASR engine comprises a cloud-based ASR engine, wherein the cloud based ASR engine requires a connection to a network to perform resolution of the speech stream and retrieve data from a cloud.

Example 17 may include the platform of Example 1, wherein the platform comprises a computing device having at least an audio digital signal processor (DSP) based ASR engine, a processor based ASR engine and a cloud based ASR engine.

Example 18 may include the platform of Example 17, wherein the computing device comprises a mobile computing device.

Example 19 may include the platform of Example 1, wherein the platform comprises a combination of a wearable device and a companion device, wherein the wearable device includes at least a voice trigger ASR engine and the companion device includes at least an audio digital signal processor (DSP) based ASR engine, a processor based ASR engine and a cloud based ASR engine.

Example 20 may include the platform of Example 1, wherein the lowest possible level of the multi-level ASR engines comprises a lowest-level ASR engine having enough resources to accurately resolve the speech stream.

Example 21 may include the platform of any one of Examples 1 to 20, wherein the speech stream comprises a request or command, and wherein the lowest possible level of multi-level ASR engines comprises a lowest-level ASR engine having enough resources to accurately resolve the speech stream and respond to the request or command.

Example 22 may include an apparatus having hierarchical speech resolution on a platform comprising one or more substrates, and logic coupled to the one or more substrates, wherein the logic includes one or more of configurable logic or fixed-functionality hardware logic, the logic coupled to the one or more substrates to receive a speech stream from a microphone, resolve the speech stream using a lowest possible level automatic speech recognition (ASR) engine of multi-level ASR engines, wherein selection of the lowest possible level ASR engine is based on policies defined for the platform, and if resolution of speech is less than a predetermined confidence rating, push resolution of the speech stream to a next higher-level ASR engine of the multi-level ASR engines until the resolution of the speech stream meets the predetermined confidence rating without violating one or more policies.

Example 23 may include the apparatus of Example 22, wherein the multi-level ASR engines comprise a hierarchical structure to provide more compute power and word recognition with each higher-level ASR engine.

Example 24 may include the apparatus of Example 22, wherein the multi-level ASR engines include two or more levels, each of the two or more levels having an ASR engine for resolving speech.

Example 25 may include the apparatus of Example 22, wherein the multi-level ASR engines include an audio digital signal processor (DSP) based ASR engine having a vocabulary of a few hundred words, a local processor based ASR engine having a large vocabulary, and a cloud based ASR engine having a very large vocabulary with unlimited processing and memory.

Example 26 may include the apparatus of Example 22, wherein the multi-level ASR engines include a voice trigger based ASR engine for limited keywords and a vocabulary set of 30-40 words, an audio digital signal processor (DSP) based ASR engine having a vocabulary of a few hundred words, a local processor based ASR engine having a large vocabulary, and a cloud based ASR engine having a very large vocabulary with unlimited processing and memory.

Example 27 may include the apparatus of Example 23, wherein the hierarchical structure of the multi-level ASR engines comprises additional processing power and a larger vocabulary for each higher-level ASR engine of the multi-level ASR engines.

Example 28 may include the apparatus of Example 22, wherein the confidence rating indicates how well an ASR engine resolved the speech stream, wherein if accuracy of the resolved speech stream is below a predefined level, the logic coupled to the one or more substrates to push resolution of the speech stream to the next higher-level ASR engine, wherein the next higher-level ASR engine includes more compute power and a larger vocabulary subsystem.

Example 29 may include the apparatus of Example 28, wherein if the accuracy of the resolved speech stream is equal to or exceeds the predefined level, the logic coupled to the one or more substrates to accept the resolution of the speech stream without pushing resolution of the speech stream to the next higher-level ASR engine.

Example 30 may include the apparatus of Example 22, wherein the one or more policies include the confidence rating, a privacy setting, user identity, system connection states, time of day, response time, and other indicators requiring resolution of the speech stream at lower-level or higher-level ASR engines.

Example 31 may include the apparatus of Example 30, wherein the privacy setting prevents specific speech from going to a cloud based ASR engine, wherein all data remains local to the platform.

Example 32 may include the apparatus of Example 30, wherein a policy for the user identity enables rules set by a user, an owner, or both the user and the owner of the platform, and wherein a policy for the privacy setting and the time of day are based on an identity of the user.

Example 33 may include the apparatus of Example 30, wherein the system connection states include connection to an Internet, connection to power, and a battery level of the platform.

Example 34 may include the apparatus of Example 30, wherein the response time includes rules that require a response that is less than a threshold.

Example 35 may include the apparatus of Example 30, wherein the other indicators comprise availability of data to perform an action or a use.

Example 36 may include the apparatus of Example 22, wherein lower-level ASR engines perform resolution of the speech stream locally without retrieving data from a cloud.

Example 37 may include the apparatus of Example 22, wherein a highest-level ASR engine comprises a cloud-based ASR engine, wherein the cloud based ASR engine requires a connection to a network to perform resolution of the speech stream and retrieve data from a cloud.

Example 38 may include the apparatus of Example 22, wherein the platform comprises a computing device having at least an audio digital signal processor (DSP) based ASR engine, a processor based ASR engine and a cloud based ASR engine.

Example 39 may include the apparatus of Example 38, wherein the computing device comprises a mobile computing device.

Example 40 may include the apparatus of Example 22, wherein the platform comprises a combination of a wearable device and a companion device, wherein the wearable device includes at least a voice trigger ASR engine and the companion device includes at least an audio digital signal processor (DSP) based ASR engine, a processor based ASR engine and a cloud based ASR engine.

Example 41 may include the apparatus of Example 22, wherein the lowest possible level of the multi-level ASR engines comprises a lowest-level ASR engine having enough resources to accurately resolve the speech stream.

Example 42 may include the apparatus of any one of Examples 22 to 41, wherein the speech stream comprises a request or command, and wherein the lowest possible level of multi-level ASR engines comprises a lowest-level ASR engine having enough resources to accurately resolve the speech stream and respond to the request or command.

Example 43 may include a method of hierarchical speech resolution on a platform comprising receiving a speech stream from a microphone, resolving the speech stream using a lowest possible level automatic speech recognition (ASR) engine of multi-level ASR engines, wherein selection of the lowest possible level ASR engine is based on policies defined for the platform, and if resolution of speech is less than a predetermined confidence rating, pushing resolution of the speech stream to a next higher-level ASR engine of the multi-level ASR engines until the resolution of the speech stream meets the predetermined confidence rating without violating one or more policies.

Example 44 may include the method of Example 43, wherein the multi-level ASR engines comprise a hierarchical structure to provide more compute power and word recognition with each higher-level ASR engine.

Example 45 may include the method of Example 43, wherein the multi-level ASR engines include two or more levels, each of the two or more levels having an ASR engine for resolving speech.

Example 46 may include the method of Example 43, wherein the multi-level ASR engines include an audio digital signal processor (DSP) based ASR engine having a vocabulary of a few hundred words, a local processor based ASR engine having a large vocabulary, and a cloud based ASR engine having a very large vocabulary with unlimited processing and memory.

Example 47 may include the method of Example 43, wherein the multi-level ASR engines include a voice trigger based ASR engine for limited keywords and a vocabulary set of 30-40 words, an audio digital signal processor (DSP) based ASR engine having a vocabulary of a few hundred words, a local processor based ASR engine having a large vocabulary, and a cloud based ASR engine having a very large vocabulary with unlimited processing and memory.

Example 48 may include the method of Example 44, wherein the hierarchical structure of the multi-level ASR engines comprises additional processing power and a larger vocabulary for each higher-level ASR engine of the multi-level ASR engines.

Example 49 may include the method of Example 43, wherein the confidence rating indicates how well an ASR engine resolved the speech stream, wherein if accuracy of the resolved speech stream is below a predefined level, pushing resolution of the speech stream to the next higher-level ASR engine, wherein the next higher-level ASR engine includes more compute power and a larger vocabulary subsystem.

Example 50 may include the method of Example 49 wherein if the accuracy of the resolved speech stream is equal to or exceeds the predefined level, accepting the resolution of the speech stream without pushing resolution of the speech stream to the next higher-level ASR engine.

Example 51 may include the method of Example 43, wherein the one or more policies include the confidence rating, a privacy setting, user identity, system connection states, time of day, response time, and other indicators requiring resolution of the speech stream at lower-level or higher-level ASR engines.

Example 52 may include the method of Example 51, wherein the privacy setting prevents specific speech from going to a cloud based ASR engine, wherein all data remains local to the platform.

Example 53 may include the method of Example 51, wherein a policy for the user identity enables rules set by a user, an owner, or both the user and the owner of the platform, and wherein a policy for the privacy setting and the time of day are based on an identity of the user.

Example 54 may include the method of Example 51, wherein the system connection states include connection to an Internet, connection to power, and a battery level of the platform.

Example 55 may include the method of Example 51, wherein the response time includes rules that require a response that is less than a threshold.

Example 56 may include the method of Example 51, wherein the other indicators comprise availability of data to perform an action or a use.

Example 57 may include the method of Example 43, wherein lower-level ASR engines perform resolution of the speech stream locally without retrieving data from a cloud.

Example 58 may include the method of Example 43, wherein a highest-level ASR engine comprises a cloud-based ASR engine, wherein the cloud based ASR engine requires a connection to a network to perform resolution of the speech stream and retrieve data from a cloud.

Example 59 may include the method of Example 43, wherein the platform comprises a computing device having at least an audio digital signal processor (DSP) based ASR engine, a processor based ASR engine and a cloud based ASR engine.

Example 60 may include the method of Example 59, wherein the computing device comprises a mobile computing device.

Example 61 may include the method of Example 43, wherein the platform comprises a combination of a wearable device and a companion device, wherein the wearable device includes at least a voice trigger ASR engine and the companion device includes at least an audio digital signal processor (DSP) based ASR engine, a processor based ASR engine and a cloud based ASR engine.

Example 62 may include the method of Example 43, wherein the lowest possible level of the multi-level ASR engines comprises a lowest-level ASR engine having enough resources to accurately resolve the speech stream.

Example 63 may include the method of any one of Examples 43 to 62, wherein the speech stream comprises a request or command, and wherein the lowest possible level of multi-level ASR engines comprises a lowest-level ASR engine having enough resources to accurately resolve the speech stream and respond to the request or command.

Example 64 may include at least one computer readable medium, comprising a set of instructions, which when executed by a computing device, cause the computing device to receive a speech stream from a microphone, resolve the speech stream using a lowest possible level automatic speech recognition (ASR) engine of multi-level ASR engines, wherein selection of the lowest possible level ASR engine is based on policies defined for the platform, and if resolution of speech is less than a predetermined confidence rating, push resolution of the speech stream to a next higher-level ASR engine of the multi-level ASR engines until the resolution of the speech stream meets the predetermined confidence rating without violating one or more policies.

Example 65 may include the at least one computer readable medium of Example 64, wherein the multi-level ASR engines comprise a hierarchical structure to provide more compute power and word recognition with each higher-level ASR engine.

Example 66 may include the at least one computer readable medium of Example 64, wherein the multi-level ASR engines include two or more levels, each of the two or more levels having an ASR engine for resolving speech.

Example 67 may include the at least one computer readable medium of Example 64, wherein the multi-level ASR engines include an audio digital signal processor (DSP) based ASR engine having a vocabulary of a few hundred words, a local processor based ASR engine having a large vocabulary, and a cloud based ASR engine having a very large vocabulary with unlimited processing and memory.

Example 68 may include the at least one computer readable medium of Example 64, wherein the multi-level ASR engines include a voice trigger based ASR engine for limited keywords and a vocabulary set of 30-40 words, an audio digital signal processor (DSP) based ASR engine having a vocabulary of a few hundred words, a local processor based ASR engine having a large vocabulary, and a cloud based ASR engine having a very large vocabulary with unlimited processing and memory.

Example 69 may include the at least one computer readable medium of Example 65, wherein the hierarchical structure of the multi-level ASR engines comprises additional processing power and a larger vocabulary for each higher-level ASR engine of the multi-level ASR engines.

Example 70 may include the at least one computer readable medium of Example 64, wherein the confidence rating indicates how well an ASR engine resolved the speech stream, wherein if accuracy of the resolved speech stream is below a predefined level, instructions, which when executed by the computing device, cause the computing device to push resolution of the speech stream to the next higher-level ASR engine, wherein the next higher-level ASR engine includes more compute power and a larger vocabulary subsystem.

Example 71 may include the at least one computer readable medium of Example 70, wherein if the accuracy of the resolved speech stream is equal to or exceeds the predefined level, instructions, which when executed by the computing device, cause the computing device to accept the resolution of the speech stream without pushing resolution of the speech stream to the next higher-level ASR engine.

Example 72 may include the at least one computer readable medium of Example 64, wherein the one or more policies include the confidence rating, a privacy setting, user identity, system connection states, time of day, response time, and other indicators requiring resolution of the speech stream at lower-level or higher-level ASR engines.

Example 73 may include the at least one computer readable medium of Example 72, wherein the privacy setting prevents specific speech from going to a cloud based ASR engine, wherein all data remains local to the platform.

Example 74 may include the at least one computer readable medium of Example 72, wherein a policy for the user identity enables rules set by a user, an owner, or both the user and the owner of the platform, and wherein a policy for the privacy setting and the time of day are based on an identity of the user.

Example 75 may include the at least one computer readable medium of Example 72, wherein the system connection states include connection to an Internet, connection to power, and a battery level of the platform.

Example 76 may include the at least one computer readable medium of Example 72, wherein the response time includes rules that require a response that is less than a threshold.

Example 77 may include the at least one computer readable medium of Example 72, wherein the other indicators comprise availability of data to perform an action or a use.

Example 78 may include the at least one computer readable medium of Example 64, wherein lower-level ASR engines perform resolution of the speech stream locally without retrieving data from a cloud.

Example 79 may include the at least one computer readable medium of Example 64, wherein a highest-level ASR engine comprises a cloud based ASR engine, wherein the cloud based ASR engine requires a connection to a network to perform resolution of the speech stream and retrieve data from a cloud.

Example 80 may include the at least one computer readable medium of Example 64, wherein the platform comprises a computing device having at least an audio digital signal processor (DSP) based ASR engine, a processor based ASR engine and a cloud based ASR engine.

Example 81 may include the at least one computer readable medium of Example 80, wherein the computing device comprises a mobile computing device.

Example 82 may include the at least one computer readable medium of Example 64, wherein the platform comprises a combination of a wearable device and a companion device, wherein the wearable device includes at least a voice trigger ASR engine and the companion device includes at least an audio digital signal processor (DSP) based ASR engine, a processor based ASR engine and a cloud based ASR engine.

Example 83 may include the at least one computer readable medium of Example 64, wherein the lowest possible level of the multi-level ASR engines comprises a lowest-level ASR engine having enough resources to accurately resolve the speech stream.

Example 84 may include the at least one computer readable medium of any one of Examples 64 to 83, wherein the speech stream comprises a request or command, and wherein the lowest possible level of multi-level ASR engines comprises a lowest-level ASR engine having enough resources to accurately resolve the speech stream and respond to the request or command.

Example 85 may include an apparatus having hierarchical speech resolution on a platform comprising means for receiving a speech stream from a microphone, means for resolving the speech stream using a lowest possible level automatic speech recognition (ASR) engine of multi-level ASR engines, wherein selection of the lowest possible level ASR engine is based on policies defined for the platform, and if resolution of speech is less than a predetermined confidence rating, means for pushing resolution of the speech stream to a next higher-level ASR engine of the multi-level ASR engines until the resolution of the speech stream meets the predetermined confidence rating without violating one or more policies.

Example 86 may include the apparatus of Example 85, wherein the multi-level ASR engines comprise a hierarchical structure to provide more compute power and word recognition with each higher-level ASR engine.

Example 87 may include the apparatus of Example 85, wherein the multi-level ASR engines include two or more levels, each of the two or more levels having an ASR engine for resolving speech.

Example 88 may include the apparatus of Example 85, wherein the multi-level ASR engines include an audio digital signal processor (DSP) based ASR engine having a vocabulary of a few hundred words, a local processor based ASR engine having a large vocabulary, and a cloud based ASR engine having a very large vocabulary with unlimited processing and memory.

Example 89 may include the apparatus of Example 85, wherein the multi-level ASR engines include a voice trigger based ASR engine for limited keywords and a vocabulary set of 30-40 words, an audio digital signal processor (DSP) based ASR engine having a vocabulary of a few hundred words, a local processor based ASR engine having a large vocabulary, and a cloud based ASR engine having a very large vocabulary with unlimited processing and memory.

Example 90 may include the apparatus of Example 86, wherein the hierarchical structure of the multi-level ASR engines comprises additional processing power and a larger vocabulary for each higher-level ASR engine of the multi-level ASR engines.

Example 91 may include the apparatus of Example 85, wherein the confidence rating indicates how well an ASR engine resolved the speech stream, wherein if accuracy of the resolved speech stream is below a predefined level, means for pushing resolution of the speech stream to the next higher-level ASR engine, wherein the next higher-level ASR engine includes more compute power and a larger vocabulary subsystem.

Example 92 may include the apparatus of Example 91, wherein if the accuracy of the resolved speech stream is equal to or exceeds the predefined level, means for accepting the resolution of the speech stream without pushing resolution of the speech stream to the next higher-level ASR engine.

Example 93 may include the apparatus of Example 85, wherein the one or more policies include the confidence rating, a privacy setting, user identity, system connection states, time of day, response time, and other indicators requiring resolution of the speech stream at lower-level or higher-level ASR engines.

Example 94 may include the apparatus of Example 93, wherein the privacy setting prevents specific speech from going to a cloud based ASR engine, wherein all data remains local to the platform.

Example 95 may include the apparatus of Example 93, wherein a policy for the user identity enables rules set by a user, an owner, or both the user and the owner of the platform, and wherein a policy for the privacy setting and the time of day are based on an identity of the user.

Example 96 may include the apparatus of Example 93, wherein the system connection states include connection to an Internet, connection to power, and a battery level of the platform.

Example 97 may include the apparatus of Example 93, wherein the response time includes rules that require a response that is less than a threshold.

Example 98 may include the apparatus of Example 93, wherein the other indicators comprise availability of data to perform an action or a use.

Example 99 may include the apparatus of Example 85, wherein lower-level ASR engines perform resolution of the speech stream locally without retrieving data from a cloud.

Example 100 may include the apparatus of Example 85, wherein a highest-level ASR engine comprises a cloud-based ASR engine, wherein the cloud based ASR engine requires a connection to a network to perform resolution of the speech stream and retrieve data from a cloud.

Example 101 may include the apparatus of Example 85, wherein the platform comprises a computing device having at least an audio digital signal processor (DSP) based ASR engine, a processor based ASR engine and a cloud based ASR engine.

Example 102 may include the apparatus of Example 101, wherein the computing device comprises a mobile computing device.

Example 103 may include the apparatus of Example 85, wherein the platform comprises a combination of a wearable device and a companion device, wherein the wearable device includes at least a voice trigger ASR engine and the companion device includes at least an audio digital signal processor (DSP) based ASR engine, a processor based ASR engine and a cloud based ASR engine.

Example 104 may include the apparatus of Example 85, wherein the lowest possible level of the multi-level ASR engines comprises a lowest-level ASR engine having enough resources to accurately resolve the speech stream.

Example 105 may include the apparatus of any one of Examples 85 to 104, wherein the speech stream comprises a request or command, and wherein the lowest possible level of multi-level ASR engines comprises a lowest-level ASR engine having enough resources to accurately resolve the speech stream and respond to the request or command.

Example 106 may include at least one computer readable medium comprising a set of instructions, which when executed by a computing system, cause the computing system to perform the method of any one of Examples 43 to 63.

Example 107 may include an apparatus comprising means for performing the method of any one of Examples 43 to 63.

Example 108 may include a system having hierarchical speech resolution, comprising a microphone to receive a speech stream, a plurality of automatic speech recognition (ASR) engines, the ASR engines configured as a multi-level hierarchical structure to provide more compute power and word recognition with each higher-level ASR engine, and a policy manager to push resolution of the speech stream to one of the plurality of ASR engines capable of resolving the speech stream based on policies defined by the system.

Example 109 may include the system of Example 108, further comprising a trigger detector to detect a trigger for receiving the speech stream.

Example 110 may include the system of Example 108, wherein the plurality of automatic speech recognition (ASR) engines configured as a multi-level hierarchical structure include two or more levels, each of the two or more levels having an ASR engine for resolving speech.

Example 111 may include the system of Example 108, wherein the plurality of automatic speech recognition (ASR) engines include an audio digital signal processor (DSP) based ASR engine having a vocabulary of a few hundred words, a local processor based ASR engine having a large vocabulary, and a cloud based ASR engine having a very large vocabulary with unlimited processing power and memory.

Example 112 may include the system of Example 111, wherein the plurality of ASR engines further includes a voice trigger based ASR engine for limited keywords and a vocabulary set of 30-40 words.

Example 113 may include the system of Example 108, wherein the one or more policies include a confidence rating to indicate how well an ASR engine resolved the speech stream, wherein if accuracy of the resolved speech stream is below a predefined level, the system to push resolution of the speech stream to a next higher-level ASR engine, wherein the next higher-level ASR engine includes more compute power and a larger vocabulary subsystem.

Example 114 may include the system of Example 113, wherein if the accuracy of the resolved speech stream is equal to or exceeds the predefined level, the system to accept the resolution of the speech stream without pushing the speech stream to the next higher-level ASR engine.

Example 115 may include the system of Example 108, wherein the one or more policies include a confidence rating, a privacy setting, user identity, system connection states, time of day, response time, and other indicators requiring resolution of the speech stream at lower or higher ASR engine levels.

Embodiments are applicable for use with all types of semiconductor integrated circuit ("IC") chips. Examples of these IC chips include but are not limited to processors, controllers, chipset engines, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other engines may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the engines in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A platform having hierarchical speech resolution, comprising:
    network interface circuitry to receive a speech stream from a microphone;
    a processor coupled to the network interface circuitry;
    one or more memory devices coupled to the processor, the one or more memory devices including instructions, which when executed by the processor, cause the platform to:
        resolve the speech stream using a lowest possible level automatic speech recognition (ASR) engine of multi-level ASR engines, wherein the multi-level ASR engines include a voice trigger based ASR engine for limited keywords and a vocabulary set of 30-40 words, an audio digital signal processor (DSP) based ASR engine having a vocabulary of a few hundred words, a local processor based ASR engine having a large vocabulary, and a cloud based ASR engine having a very large vocabulary with unlimited processing and memory and wherein selection of the lowest possible level ASR engine is based on policies defined for the platform; and
        when resolution of speech is less than a predetermined confidence rating, push resolution of the speech stream to a next higher-level ASR engine of the multi-level ASR engines until the resolution of the speech stream meets the predetermined confidence rating without violating one or more policies.

2. The platform of claim 1, wherein the multi-level ASR engines comprise a hierarchical structure to provide more compute power and word recognition with each higher-level ASR engine.

3. The platform of claim 2, wherein the hierarchical structure of the multi-level ASR engines comprises additional processing power and a larger vocabulary for each higher-level ASR engine of the multi-level ASR engines.

4. The platform of claim 1, wherein the confidence rating indicates how well an ASR engine resolved the speech stream, wherein if accuracy of the resolved speech stream is below a predefined level, the instructions, when executed, are to push resolution of the speech stream to the next higher-level ASR engine, wherein the next higher-level ASR engine includes more compute power and a larger vocabulary subsystem.

5. The platform of claim 4, wherein if the accuracy of the resolved speech stream is equal to or exceeds the predefined level, the instructions, when executed, are to accept the resolution of the speech stream without pushing resolution of the speech stream to the next higher-level ASR engine.

6. The platform of claim 1, wherein the one or more policies include the confidence rating, a privacy setting, user identity, system connection states, time of day, response time, and other indicators requiring resolution of the speech stream at lower-level or higher-level ASR engines.

7. The platform of claim 6, wherein the privacy setting prevents specific speech from going to a cloud based ASR engine, wherein all data remains local to the platform.

8. An apparatus having hierarchical speech resolution on a platform comprising:
    one or more substrates; and
    logic coupled to the one or more substrates, wherein the logic includes one or more of configurable logic or fixed-functionality hardware logic, the logic coupled to the one or more substrates to:
    receive a speech stream from a microphone;
    resolve the speech stream using a lowest possible level automatic speech recognition (ASR) engine of multi-level ASR engines, wherein the multi-level ASR engines include a voice trigger based ASR engine for limited keywords and a vocabulary set of 30-40 words, an audio digital signal processor (DSP) based ASR engine having a vocabulary of a few hundred words, a local processor based ASR engine having a large vocabulary, and a cloud based ASR engine having a very large vocabulary with unlimited processing and memory and wherein selection of the lowest possible level ASR engine is based on policies defined for the platform; and when resolution of speech is less than a predetermined confidence rating, push resolution of the speech stream to a next higher-level ASR engine of the multi-level ASR engines until the resolution of the speech stream meets the predetermined confidence rating without violating one or more policies.

9. The apparatus of claim 8, wherein the multi-level ASR engines comprise a hierarchical structure to provide more compute power and word recognition with each higher-level ASR engine.

10. The apparatus of claim 9, wherein the hierarchical structure of the multi-level ASR engines comprises additional processing power and a larger vocabulary for each higher-level ASR engine of the multi-level ASR engines.

11. The apparatus of claim 8, wherein the one or more policies include the confidence rating, a privacy setting, user identity, system connection states, time of day, response time, and other indicators requiring resolution of the speech stream at lower-level or higher-level ASR engines.

12. The apparatus of claim 11, wherein the privacy setting prevents specific speech from going to a cloud based ASR engine, wherein all data remains local to the platform.

13. A method of hierarchical speech resolution on a platform comprising:

receiving a speech stream from a microphone;

resolving the speech stream using a lowest possible level automatic speech recognition (ASR) engine of multi-level ASR engines, wherein the multi-level ASR engines include a voice trigger based ASR engine for limited keywords and a vocabulary set of 30-40 words, an audio digital signal processor (DSP) based ASR engine having a vocabulary of a few hundred words, a local processor based ASR engine having a large vocabulary, and a cloud based ASR engine having a very large vocabulary with unlimited processing and memory and wherein selection of the lowest possible level ASR engine is based on policies defined for the platform; and when resolution of speech is less than a predetermined confidence rating, pushing resolution of the speech stream to a next higher-level ASR engine of the multi-level ASR engines until the resolution of the speech stream meets the predetermined confidence rating without violating one or more policies.

14. The method of claim 13, wherein the multi-level ASR engines comprise a hierarchical structure to provide more compute power and word recognition with each higher-level ASR engine.

15. The method of claim 14, wherein the hierarchical structure of the multi-level ASR engines comprises additional processing power and a larger vocabulary for each higher-level ASR engine of the multi-level ASR engines.

16. The method of claim 13 wherein the one or more policies include the confidence rating, a privacy setting, user identity, system connection states, time of day, response time, and other indicators requiring resolution of the speech stream at lower-level or higher-level ASR engines.

17. The method of claim 16, wherein the privacy setting prevents specific speech from going to a cloud based ASR engine, wherein all data remains local to the platform.

18. At least one non-transitory computer readable medium, comprising a set of instructions, which when executed by a computing device, cause the computing device to:

receive a speech stream from a microphone;

resolve the speech stream using a lowest possible level automatic speech recognition (ASR) engine of multi-level ASR engines, wherein the multi-level ASR engines include a voice trigger based ASR engine for limited keywords and a vocabulary set of 30-40 words, an audio digital signal processor (DSP) based ASR engine having a vocabulary of a few hundred words, a local processor based ASR engine having a large vocabulary, and a cloud based ASR engine having a very large vocabulary with unlimited processing and memory and wherein selection of the lowest possible level ASR engine is based on policies defined for the platform; and when resolution of speech is less than a predetermined confidence rating, push resolution of the speech stream to a next higher-level ASR engine of the multi-level ASR engines until the resolution of the speech stream meets the predetermined confidence rating without violating one or more policies.

19. The at least one non-transitory computer readable medium of claim 18, wherein the multi-level ASR engines comprise a hierarchical structure to provide more compute power and word recognition with each higher-level ASR engine.

20. The at least one non-transitory computer readable medium of claim 19, wherein the hierarchical structure of the multi-level ASR engines comprises additional processing power and a larger vocabulary for each higher-level ASR engine of the multi-level ASR engines.

21. The at least one non-transitory computer readable medium of claim 18, wherein the one or more policies include the confidence rating, a privacy setting, user identity, system connection states, time of day, response time, and other indicators requiring resolution of the speech stream at lower-level or higher-level ASR engines.

22. The at least one non-transitory computer readable medium of claim 21, wherein the privacy setting is to prevent specific speech from going to a cloud based ASR engine, and wherein all data remains local to the platform.

* * * * *